United States Patent [19]

Radlin

[11] 4,363,430

[45] Dec. 14, 1982

[54] ANTITHEFT GARMENT HANGER AND DEVICE

[76] Inventor: Alexander Radlin, 1770 Parent Ave., Windsor, Ontario, Canada, N8X 4K1

[21] Appl. No.: 82,791

[22] Filed: Oct. 9, 1979

[30] Foreign Application Priority Data

Aug. 24, 1979 [CA] Canada ..................................... 334404

[51] Int. Cl.[3] ..................... A47J 51/082; A47J 51/097; A47J 51/142

[52] U.S. Cl. ......................................... 223/88; 223/87; 223/91; D6/257

[58] Field of Search ....................... 223/85, 93, 87, 88, 223/92, 91; D6/247, 249, 257, 256; 211/113; 40/322; 206/300

[56] References Cited

U.S. PATENT DOCUMENTS

| | | | |
|---|---|---|---|
| D. 219,692 | 1/1971 | Kufchock | D6/256 |
| D. 241,492 | 9/1976 | Schwalbe | D6/247 X |
| 962,513 | 6/1910 | MacIntosh | 223/93 |
| 980,219 | 1/1911 | Drucker | 223/88 |
| 1,040,181 | 10/1912 | Frank | D6/249 UX |
| 1,547,951 | 7/1925 | Olson | 223/88 |
| 1,784,569 | 12/1930 | Bartlett, Jr. | 223/87 |
| 1,799,690 | 4/1931 | Kanowitz | 223/87 X |
| 2,615,602 | 10/1952 | Thompson et al. | 223/87 |
| 2,639,844 | 5/1953 | Udvardy | 223/92 X |
| 2,796,206 | 6/1957 | Schwartz | D6/249 UX |
| 3,208,651 | 9/1965 | Sklarow | D6/249 UX |
| 3,266,684 | 8/1966 | Weddle | 223/93 |
| 3,755,822 | 9/1973 | Bobry | 223/85 X |
| 4,069,691 | 1/1978 | Simpson | D6/257 X |

FOREIGN PATENT DOCUMENTS

| | | | |
|---|---|---|---|
| 435486 | 10/1926 | Fed. Rep. of Germany | 223/92 |
| 2331662 | 6/1977 | France | 223/85 |
| 1077 | of 1912 | United Kingdom | 223/88 |
| 892052 | 3/1962 | United Kingdom | 223/85 |
| 1377668 | 12/1974 | United Kingdom | 223/92 |

*Primary Examiner*—Robert Mackey
*Attorney, Agent, or Firm*—Hauke and Patalidis

[57] ABSTRACT

Apparatus having a pair of arms that are oppositely directed and which are adapted to suspend a garment includes a hook that is located intermediate the free ends of the arms for suspending the hanger and garment from a rail. In one embodiment, a bar that is substantially rigid and inflexible has one end secured to the hook and extends downwardly therefrom. Another embodiment includes a crossmember that joins the free end of the arms and the secured end of the bar is swingably attached to the crossmember. A further embodiment retains the bar in a swingably captive position on the crossmember. In still another embodiment, the arms, crossmember, hook and bar comprise an integral, unitary structure that is more simple to construct. The bar in each embodiment has a smooth, regular surface to prevent snagging the garment and it is sufficiently long to prevent rolling up the hanger and garment into a small size which otherwise would facilitate its theft.

13 Claims, 8 Drawing Figures

ANTITHEFT GARMENT HANGER AND DEVICE

BACKGROUND OF THE INVENTION

This invention relates to a garment hanger and more particularly to a garment hanger that is adapted to deter or at least discourage the theft of the hanger and a garment draped thereon.

Stock shrinkage and other unexplained losses of inventory are commonly attributable to theft by both professional and amateur thieves. Whereas the latter will frequently remove a garment from its hanger, the former seldom do so, knowing that an empty hanger is readily spotted by sales staff and alerts store personnel to the fact that a theft has occurred.

Solutions proposed in the prior art to prevent theft by shoplifters include garment hangers that are provided with locking means which attach both the garment and its hanger to a hanging rail to prevent unauthorized removal. Another answer to the problem, proposed by the prior art, is a transparent enclosure that is locked to its mounting rail but still permits the garment to be viewed through transparent sidewalls.

Still another method that is commonly used is the attachment to the garment of a device that is detectable, the detection of which sounds an alarm to indicate when a garment or other article of apparel is being removed from the premises without authorization.

While the foregoing apparatus and methods are each effective in their own right, each represents a relatively expensive solution to the problem of shoplifting. Moreover, closer attendance by store personnel is required to unlock and remove garments from their respective hangers and to replace same in the event that a prospective buyer is disinterested in making a purchase.

SUMMARY

A provision of the present invention is an antitheft garment hanger and device that will deter or at least discourage professional shoplifters by preventing the hanger and the garment thereon from being folded rapidly into a small size preparatory to theft thereof.

Another provision of the invention is an antitheft garment hanger having a depending bar that has a length substantially greater than the width of the hanger.

Still another provision of the invention is an antitheft garment hanger in which the free end of the depending bar comprises a crossbar that is integral therewith and which is disposed in spaced, substantially parallel relation with a crossmember of the hanger.

Still another provision of the invention is an antitheft garment hanger that is of unitary construction.

A still further provision of the invention is an antitheft garment hanger having a depending bar that is swingably securable to the crossmember or to a suspending hook of the hanger.

A further provision of the invention is an antitheft garment hanger that is simple and inexpensive to produce.

The disadvantages of the prior art may be substantially overcome and the foregoing provisions achieved by recourse to the invention which is an antitheft garment hanger comprising a body portion having a pair of arms oppositely directed and adapted to suspend a garment, means disposed intermediate the free ends of the arms for suspending the body portion, and a bar, substantially rigid and inflexible having one end secured to the body portion and depending downwardly therefrom, the bar having a smooth, regular surface to prevent snagging the garment and a length substantially greater than the arms to prevent rolling up the hanger and garment into a small size preparatory to theft thereof.

The invention will now be more particularly described having regard to embodiments thereof shown, by way of example, in the appended drawings in which:

DETAILED DESCRIPTION OF THE PREFERRED EMBODIMENTS

Figure 1:
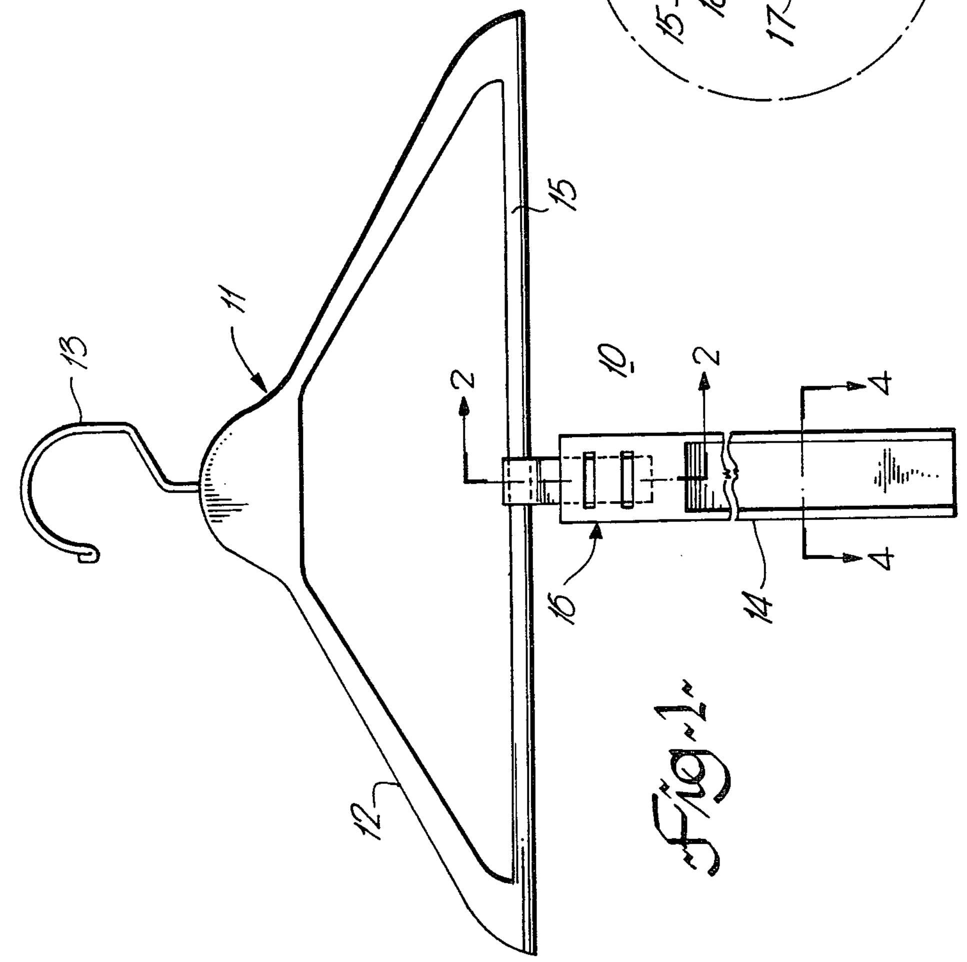
FIG. 1 is a front elevation view of a hanger and bar device according to the present invention.

An antitheft garment hanger 10 appears in FIG. 1 and is shown to comprise a body portion 11 having a pair of arms 12 that are oppositely directed and which are adapted to suspend a garment (not shown). Suspension means in the form of a hook 13 is disposed intermediate the free ends of the arms 12 and is used to suspend the body portion 11 from a hanging rail or other supporting structure, neither of which are shown.

A bar 14 that is substantially rigid and inflexible is shown to be swingably secured to a crossmember 15 of the body 11. It will be observed that the crossmember 15 joins the free ends of the arms 12 to provide a more rigid structure in addition to providing a support from which one end of the bar 14 is swingably secured and which depends downwardly therefrom. Particular note should be taken of the fact that the bar 14 has a smooth regular surface to prevent snagging a garment that may be draped over the arms 12. It will be understood that the length of the bar 14 is substantially greater than the distance spanned by the arms 12 and it is this feature in addition to the rigidity and inflexibility of the bar, that prevents rolling up the hanger and garment into a small size preparatory to its theft. In this regard, it will be understood that commonly used plastic materials having the foregoing qualities may be employed in the fabrication of the bar 14. Common examples are acrylic plastic, for one, and fiber glass, for another. Irrespective of the material from which the bar 14 is fabricated, it is important that the qualities of rigidity and inflexibility be maintained in order to prevent the hanger 10 and the garment from being rolled up. While it would be preferred that the bar 14 be unbreakable, it is recognized that this characteristic is not readily achievable using a plastic material and that recourse to metals must be taken to obtain this characteristic. However, the feature of discouraging theft is still maintained using plastics if, in the construction of the bar 14, a relatively brittle plastic such as styrene is used which will fracture loudly to indicate that a theft is in progress.

In the embodiment illustrated, the bar 14 is swingably secured to the crossmember 15 by means of a latch 16.

Figure 2:
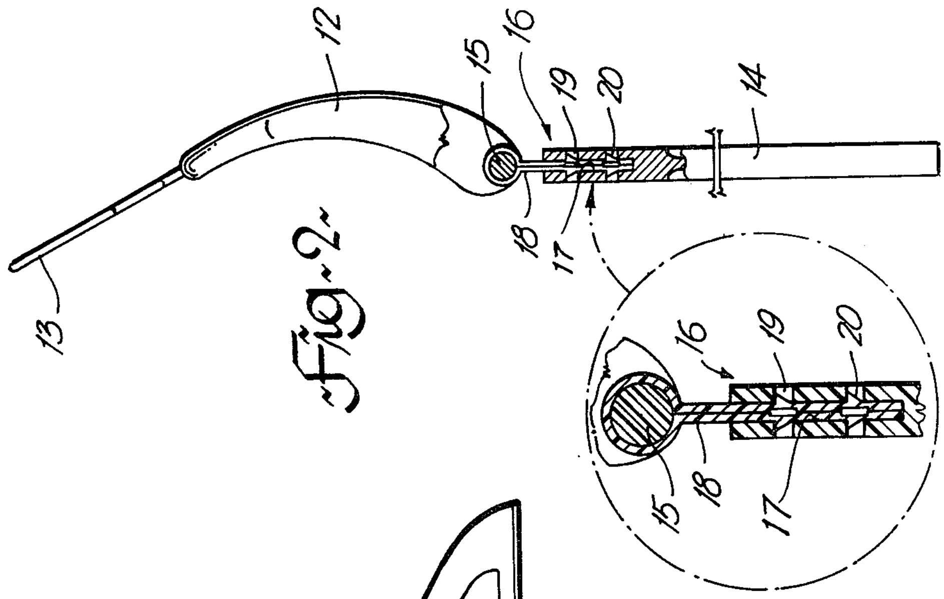
FIG. 2 is a side view of the hanger and device of FIG. 1 with a portion in section taken along the lines 2—2.

Reference to FIG. 2, which is a side elevation of FIG. 1, shows a portion in section which clearly illustrates the arrangement of the latch 16 and the manner in which it is retained in one end of the bar 14. It will be observed that the secured end defines a parallelepipedal cavity 17 into which fit a pair of tabs 18 of the latch 16. The detailed sectional view in FIG. 2 shows slots 19 which engage with flukes 20. Having inserted the tabs 18 into the cavity 17, a sideways pressure exerted by a spring-open tendency of the tabs 18 maintains the flukes 20 engaged with the slots 19.

Figure 3:
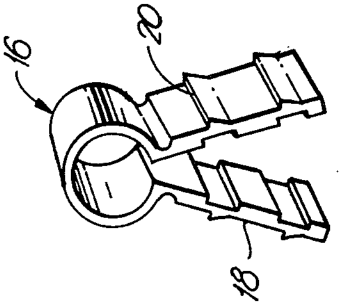
FIG. 3 is a perspective view of a latch according to the invention.

The perspective view in FIG. 3 illustrates a normally open position of the latch 16.

Figure 4:
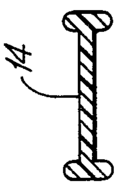
FIG. 4 is a sectional view taken along the lines 4—4 of FIG. 1.

It has been found that the required characteristics of rigidity and inflexibility may be more readily achieved by fabricating the bar 14 with an "I" section as shown in FIG. 4.

Figure 5:
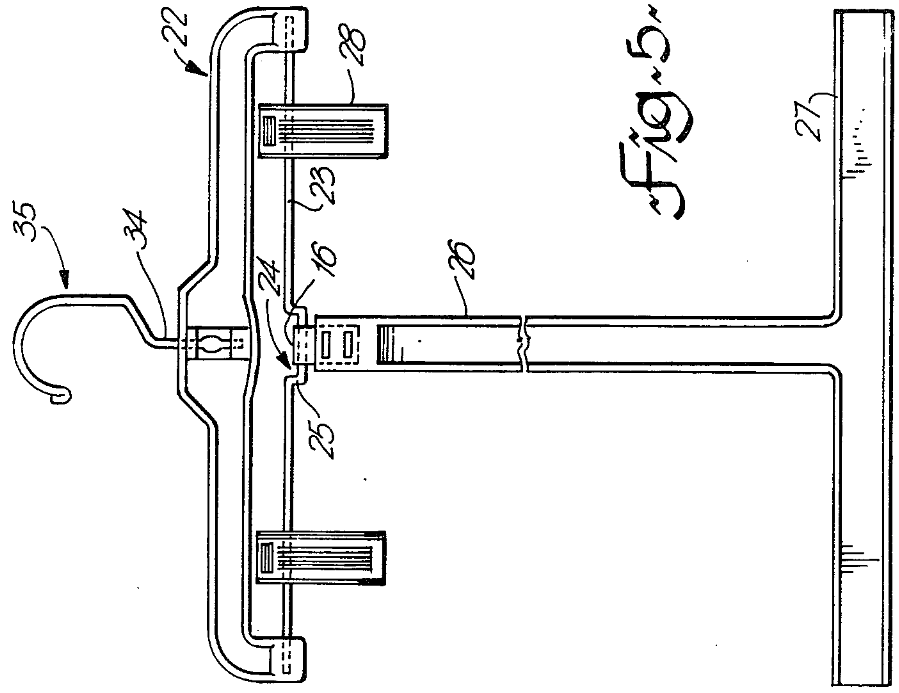
FIG. 5 is a front elevation view of another embodiment of an antitheft garment hanger and device according to the invention.

Another embodiment is illustrated in FIG. 5. Principal differences in this embodiment include a hanger 22 having a wire crossmember 23 which is formed with a centrally disposed crank portion 24. The portion 24 is offset from the longitudinal axis of the crossmember 23 and is disposed parallel thereto. Note that end portions 25 define the crank and the portion thereof on which is swingably attached in captive relation the secured end of a depending bar 26.

It will be observed that the bar 26 has a free end which comprises a crossbar 27 that is integral with the free end and which is disposed in spaced, substantially parallel relation with the crossmember 23. The purpose of the crossbar 27 is to further deter and discourage would-be thieves by still further reducing the likelihood of rolling up the hanger 22 together with a garment. Additionally, the crossbar 27 would make it more awkward to slip the hanger and its garment into a container such as a shopping bag in view of the brief time available to the thief, normally about five seconds.

A pair of clips 28 are shown slidably positioned on the crossmember 23, the clips being present to releasably attach a garment such as a woman's skirt or man's trousers to the hanger.

Figure 6:
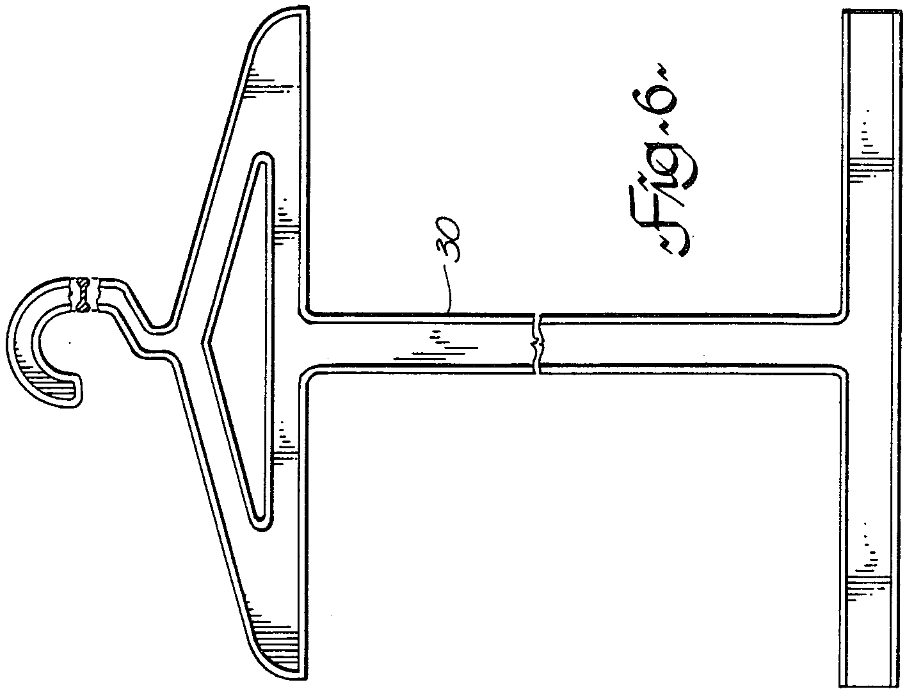
FIG. 6 is still another embodiment of the invention.

Similar to the embodiment illustrated in FIG. 5 is another embodiment which is shown in FIG. 6. Illustrated therein is an antitheft garment hanger 30 which is fabricated as a unitary structure that is more economical to manufacture. It will be understood that to provide necessary strength and rigidity, the hanger 30 is fabricated having an "I" section similar to that shown in FIG. 4.

Figure 7:
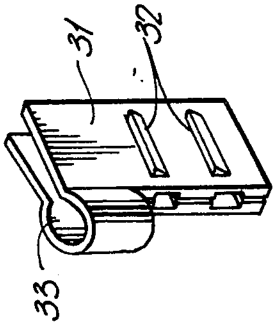
FIG. 7 is a perspective view of another latch according to the invention.

A perspective view of an offset latch 31 appears in FIG. 7. The purpose of this latch 31 is the same as the latch 16 and to this end flukes 32 are provided. However, it will be observed that a cylindrical clasping portion 33 is vertically positioned in order to clasp a vertical portion 34 of a hook 35, FIG. 5. Thus, in the event that a hanger is used that does not employ a crossmember, the bar 14 or 26 may be swingably secured to the hook.

Figure 8:
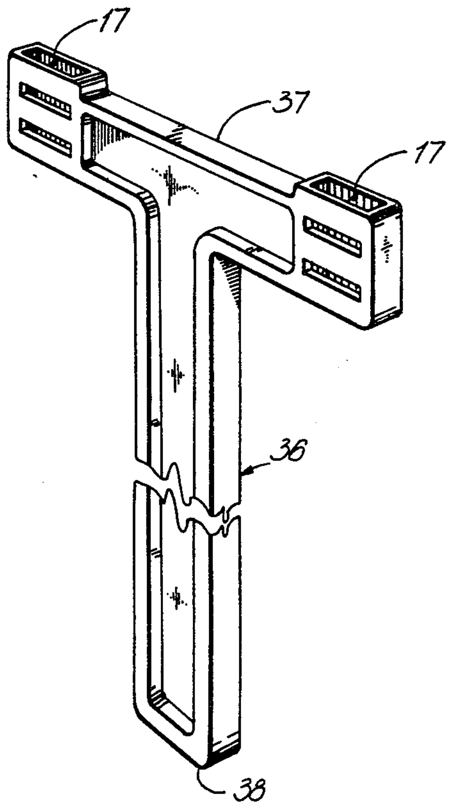
FIG. 8 is a perspective view of another embodiment of a bar device similar to the device of FIG. 1.

FIG. 8 illustrates a bar 36 that is similar to the bar 14 and may in fact be used in its place. The principal difference in both bars appears in the mounting arrangement for swingably securing one end of the bar to the crossmember 15. Whereas a single latch 16 is used in the embodiment of FIG. 1, two latches 16 are employed in the bar 36 which is provided with a "T" shaped portion 37 having a cavity 17 disposed at each free end thereof. This structural arrangement provides a sturdier swingable connection between the hanger 10 and its bar 36. Less significant is the free end of the bar 36 which is fabricated with flanges 38 to assure a smooth surface that will not snag clothing.

The embodiment of FIG. 6 finds application with lightweight garments such as women's blouses and men's shirts where several items may be carried by the hook portion of each hanger 30. Conversely, the other embodiments are useful with garments that are heavier in weight such as coats, jackets and suits. When several heavy items are carried, the swingable connection permits the garments to be draped over ones arm which makes the carrying task an easier one.

The bars disclosed herein are described as being substantially greater in length than the distance spanned by the arms of their corresponding hangers. Of course, the antitheft deterrent effect may be increased by lengthening the bar but then the hanger may become unwieldy and awkward to handle. It has been determined that an effective overall length for the bars illustrated and described is eighteen inches which provides adequate protection yet permits the hangers to be readily handled by store personnel.

Having regard to the illustrated and described embodiments of the invention, it will be apparent to those skilled in the art that variations thereof are readily feasible. Accordingly, the disclosed and illustrated embodiments should be considered as exemplary rather than restrictive of the invention which is defined in the accompanying claims.

What I claim is:

1. An antitheft garment hanger comprising:

a body portion having a pair of rigid arms oppositely directed and adapted to suspend a garment, said arms having each a free end, a cross member joining the free ends of the arms, means disposed intermediate the free ends of the arms for suspending the body portion, and a single substantially rigid and inflexible bar having one end swingably attached to the cross member intermediate the free ends of the arms and depending downwardly therefrom, said bar having a smooth non-supportive regular surface to prevent snagging the garment and a length substantially greater than the distance separating the free ends of the arms to prevent rolling up the hanger and garment into a small size preparatory to theft thereof, wherein said bar is swingably attached to the cross member by means of a latch, said latch having thin sidewalls defining a split cylindrical clasping portion adapted to swingably attach to said cross member and a tab portion extending outwardly from each split end of the clasping portion for fixed attachment to an end of said bar.

2. An antitheft garment hanger as claimed in claim 1 wherein the free end of the depending bar comprises a crossbar integral therewith and disposed in spaced, substantially parallel relation with said cross member.

3. An antitheft garment hangar as claimed in claim 1 wherein the cross member includes a centrally disposed offset portion to which is swingably attached in captive relation the end of the depending bar.

4. An antitheft garment hanger as claimed in claim 3 further comprising a clip slidably disposed on the cross member on each side of the offset portion and adapted to releasably attach a garment to the hanger.

5. An antitheft garment hanger as claimed in claim 1 wherein the attached end of said bar comprises a cavity having sides provided with slots and the tab portion comprises flukes adapted to enter said cavity and engage the slots to prevent withdrawal of said bar.

6. An antitheft garment hanger as claimed in claim 5 wherein said bar is made with an "I" section to provide a rigid and inflexible structure.

7. An antitheft garment hanger as claimed in claim 6 wherein said bar is made of metal to impede bending thereof.

8. An antitheft garment hanger as claimed in claim 6 wherein said bar is made of relatively brittle plastic which fractures loudly when broken.

9. In an antitheft garment hanger comprising a body portion having a pair of rigid arms oppositely directed and adapted to suspend a garment, said arms having each a free end, a member disposed intermediate the free ends of the arms for suspending the body portion and a cross member joining the free ends of the arms, the improvement comprising a single substantially rigid and inflexible bar having one end secured to the cross member and depending downwardly therefrom, a latch for swingably attaching said bar to said cross member, said latch having thin sidewalls defining a split cylindrical clasping portion adapted to swingably attach to said cross member and a tab portion extending outwardly from each split end of the clasping portion for fixed attachment to an end of said bar, wherein said bar has a smooth non-supportive regular surface to prevent snagging the garment and a length substantially greater than the distance separating the free ends of the arms to prevent rolling up the hanger and garment into a small size preparatory to theft thereof.

10. The improvement of claim 9 wherein the attached end of said bar comprises a cavity having slotted sides and the tab portions comprise flukes adapted to enter said cavity and engage the slots to prevent withdrawal of said bar.

11. The improvement of claim 10 wherein said bar is made with an "I" section to provide a rigid and inflexible structure.

12. The improvement of claim 11 wherein said bar is made of metal to impede bending thereof.

13. The improvement of claim 11 wherein said bar is made of relatively brittle plastic which fractures loudly when broken.

* * * * *